United States Patent
Kitson et al.

(10) Patent No.: US 9,759,974 B2
(45) Date of Patent: Sep. 12, 2017

(54) LIQUID CRYSTAL DISPLAY DEVICE

(75) Inventors: Stephen Kitson, Alveston (GB); Mario Ariosto Matranga, Avon (GB); Timothy Taphouse, Dursley (GB); Daniel M. Younger, Norwich (GB); Christopher Newton, Weston Super Mare (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 14/346,503

(22) PCT Filed: Oct. 31, 2011

(86) PCT No.: PCT/US2011/058670
§ 371 (c)(1),
(2), (4) Date: Mar. 21, 2014

(87) PCT Pub. No.: WO2013/066305
PCT Pub. Date: May 10, 2013

(65) Prior Publication Data
US 2014/0232961 A1  Aug. 21, 2014

(51) Int. Cl.
*C09K 19/52* (2006.01)
*G02F 1/139* (2006.01)
(Continued)

(52) U.S. Cl.
CPC ........ *G02F 1/1396* (2013.01); *G02F 1/13725* (2013.01); *G02F 1/133707* (2013.01)

(58) Field of Classification Search
CPC .......... G02F 1/133707; G02F 1/13725; G02F 1/1396
(Continued)

(56) References Cited

U.S. PATENT DOCUMENTS 4,278,328 A * 7/1981 Mukoh .................. C09K 19/60
  252/299.1
4,490,015 A * 12/1984 Kawarada .......... G02F 1/13725
  252/299.01
(Continued)

FOREIGN PATENT DOCUMENTS

EP          0829748 A2    3/1998
JP       2000-019564 A    1/2000
(Continued)

OTHER PUBLICATIONS

International Preliminary Report on Patentability, May 15, 2014, The International Bureau of WIPO, PCT Patent Application No. PCT/US2011/058670.
(Continued)

*Primary Examiner* — Hoan C Nguyen
(74) *Attorney, Agent, or Firm* — HP Inc. Patent Department

(57) ABSTRACT

A reflective display device includes a pixel structure (200) and a liquid crystal (210) containing a dye. The pixel structure (200) provides the liquid crystal (210) with a first tilt state and a second tilt state that are stable absent application of an electric field. In the first tilt state, the liquid crystal (210) is in an untwisted configuration. In the second tilt state, the liquid crystal (210) is in a twisted configuration, and the dye has an effective absorption that is higher than an effective absorption of the dye when the liquid crystal (210) is in the first tilt state.

15 Claims, 3 Drawing Sheets

(51) Int. Cl.
*G02F 1/1337* (2006.01)
*G02F 1/137* (2006.01)

(58) Field of Classification Search
USPC .......................................... 349/165, 168, 175
See application file for complete search history.

(56) References Cited

U.S. PATENT DOCUMENTS

| | | | | |
|---|---|---|---|---|
| 4,702,561 | A | * | 10/1987 | Huffman ................. C09B 1/205 252/299.1 |
| 4,802,743 | A | * | 2/1989 | Takao ................ G02F 1/133516 349/106 |
| 6,034,752 | A | | 3/2000 | Khan et al. |
| 6,211,933 | B1 | | 4/2001 | Mizunuma et al. |
| 6,249,332 | B1 | | 6/2001 | Bryan-Brown et al. |
| 6,351,298 | B1 | | 2/2002 | Mitsui et al. |
| 6,699,532 | B2 | | 3/2004 | Motoyama et al. |
| 6,903,790 | B2 | | 6/2005 | Kitson et al. |
| 7,061,559 | B2 | | 6/2006 | Khan et al. |
| 7,387,858 | B2 | | 6/2008 | Chari et al. |
| 7,871,539 | B2 | | 1/2011 | Takaku et al. |
| 8,294,838 | B2 | * | 10/2012 | Hegmann ............... B82Y 20/00 252/299.5 |
| 2005/0174340 | A1 | * | 8/2005 | Jones ................ G02F 1/133753 345/204 |
| 2010/0157215 | A1 | | 6/2010 | Kurosaki et al. |
| 2011/0017838 | A1 | * | 1/2011 | Delbaere ................ B42D 25/00 235/494 |
| 2013/0258266 | A1 | * | 10/2013 | Sukhomlinova ..... C09K 19/601 349/179 |

FOREIGN PATENT DOCUMENTS

| | | |
|---|---|---|
| JP | 2004-83568 A | 3/2004 |
| TW | 533328 | 5/2003 |

OTHER PUBLICATIONS

English translation (machine-generated) of Abstract from Japanese Patent Publication No. 2000-019564A [retrieved on Mar. 12, 2014], Retrieved from the Internet: <http://worldwide.espacenet.com/publicationDetails/biblio?DB=worldwide.espacenet.com&II=0&ND=3&adjacent=true&locale=en_EP&FT=D&date=20000121&CC=JP&NR=2000019564A&KC=A>.

International Search Report and Written Opinion, May 11, 2011, PCT Patent Application No. PCT/US2011/058670.

Johnes, J. Cliff, 40.1: Invited Paper: The Zenithal Bistable Device: From Concept to Consumer, SID 07 Digest, 2007, pp. 1347-1350.

Jones et al., P-10.4: High Image-Content Zenithal Bistable Devices, SID 04 Digest, 2004, pp. 140-143.

Oswald, Patrick, Phase Transitions and Unwinding of Cholesteric Liquid Crystals, Phase Transitions. Application to Liquid Crystals, Organic Electronic and Optoelectronic Field, ISBN: 81-308-0062-4, 2006, pp. 47-78.

Smalyukh et al., Electric-Field-Induced Nematic-Cholesteric Transition and Three-Dimensional Director Structures in Homeotropic Cells, The American Physical Society, Physical Review E 72061707, 2005, pp. 1-14.

"Ink Technology: Electrophoretic Ink, explained," Internet web page, http://www.eink.com/technology.html, dated Jan. 23, 2013, as retrieved on Jan. 17, 2017 from the Internet Archive Wayback Machine available at https://web.archive.org/.

* cited by examiner

LIQUID CRYSTAL DISPLAY DEVICE

CROSS-REFERENCE TO RELATED APPLICATION

This application is a U.S. National Stage Application of and claims priority to International Patent Application No. PCT/US2011/058670, filed on Oct. 31, 2011, and entitled "LIQUID CRYSTAL DISPLAY DEVICE".

BACKGROUND

Current reflective display technologies have difficulty providing bright, high contrast, color images. One of the issues with such display technologies generally is that most require an active matrix with a transistor at each pixel in the display area. The transistors and the associated connections and electrodes reduce the optical aperture of the display and therefore reduce the brightness of the reflected light. Bistable liquid crystal displays can employ a passive matrix to control the electro-optic effect of each pixel and provide a larger aperture for the reflected light because transistors are not needed in the display area. Further, in some configurations, bistable liquid crystal displays can dramatically reduce power consumption, particularly if the same image is displayed for an extended period of time. However, bistable systems commonly only use one polarization of incident light and use polarizers, which reduce the brightness of a reflective display by at least half. Further, current bistable displays do not provide a sufficient dynamic range for display of a quality color image.

BRIEF DESCRIPTION OF THE DRAWINGS

Use of the same reference symbols in different figures indicates similar or identical items.

DETAILED DESCRIPTION

A reflective liquid crystal display provides a high dynamic range and is suitable for high-quality color imaging. In one arrangement, a display device or pixel structure employs a liquid crystal (LC) that is doped with chiral additives and a pixel structure that switches the LC between two stable states with different tilt angles. The concentration of the chiral additive and the arrangement of the pixel structure are such that in one tilt state, the LC has a uniform vertical, untwisted configuration, but in the other tilt state, the LC is more planar and has a twisted configuration. The vertical tilt state can minimize the effect of a dye (e.g., dichroic or pleochroic dye) associated with the LC. The twisted configuration may provide a texture to the effect of the dye, and with or without the texture, the twisted configuration provides higher contrast than would an untwisted arrangement of the dye and LC molecules.

Doping the LC with a chiral additive at a concentration within a critical range can particularly enhance the dynamic range of a reflective pixel structure containing a dichroic or pleochroic dye. Adding a chiral dopant helps in two ways. First, the configuration of the more planar LC state becomes twisted and this ensures that the dye absorbs both polarizations of incident light, making the dark state darker. Second, the chirality of the twisted configuration improves the average planarity of the LC and dye when in the more-planar tilt state of a pixel structure because the chiral material has a natural tendency to twist and a planar orientation is energetically favored, i.e., has lower potential energy. This can amplify the effect of switching the tilt angle, particularly for a pixel structure that switches the tilt state at just one surface, and causes more of the LC to become planar in the more-planar state. If too much chiral additive is included in the LC then the vertical state will also collapse and darken, so it may be desired to add the maximum amount of chiral additive that still maintains the untwisted vertical state. For most practical materials, this limit is when the pitch is close to the cell gap.

The twisted and untwisted configurations of an LC can be distinguished based on the director field of the LC. More particularly, LCs are generally made of asymmetric molecules, including either rod or disc shaped molecular structures. The LC is in the nematic phase in which the asymmetric molecular structures tend to align with one another but are otherwise unordered. A director at any point in the LC can be defined as a unit vector having a direction corresponding to the average alignment direction of the asymmetric molecular structures of the LC at that point. In the untwisted configuration, the director is mostly vertical, and there is no particular axis of rotation for the director. In the twisted configuration, the material has a distinct axis about which the director winds or twists.

Figure 1:
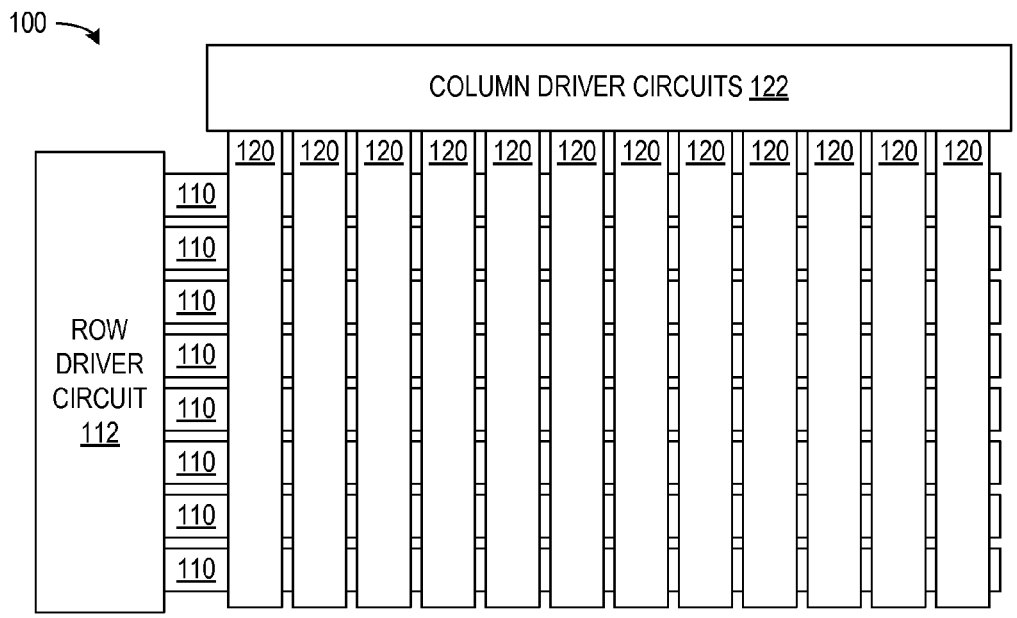
FIG. 1 shows a display employing a passive matrix.

FIG. 1 shows a simplified plan view of a reflective display 100 employing a passive-matrix architecture. Display 100 has multiple parallel row electrodes 110 and multiple parallel column electrodes 120 that cross row electrodes 110. Row electrodes 110 and column electrodes 120 are respectively connected to a row driver circuit 112 and a column driver circuit 122. Row driver circuit 112 and column driver circuit 122 are adapted to apply voltages respectively to row electrodes 110 and column electrodes 120 to change the states of pixel structures located in areas where row electrodes 110 and column electrodes 120 cross and overlap. In different arrangements, either row electrodes 110 or column electrodes 120 can be closest to a display surface of display 100 and made of a transparent conductive material such as indium tin oxide (ITO), fluorine doped tin oxide (FTO), doped zinc oxide, or PEDOT PSS. The electrodes 120 or 110 that are furthest from the display surface may be highly reflective, have a highly reflective coating, or be transparent and backed by a reflector. With this arrangement, incident light at the display surface passes through the transparent electrodes 110 or 120 and the cell gap between electrodes 110 and 120, reflects from the reflective surface associated with electrodes 120 or 110, and passes back through the cell gap and the transparent electrodes 110 or 120 and out of the display surface.

The cell gap in each pixel structure in display 100 contains liquid crystals doped with a dye, e.g., a dichroic or pleochroic dye, that is asymmetric and adopts an alignment that depends on the alignment of the liquid crystal. As a result, reorienting the LC also reorients the dye, so that if white light is incident on the pixel structure, the color of the reflected light emerging from the pixel structure depends on the color of the dye and the orientations of the dye/LCs in the cell gap. As is well known in the art, multiple pixel structures of different colors can be operated together to form a color picture element. For example, for additive color, three or four pixel structures (e.g., one pixel structure containing a red dye, pigment, or filter, one pixel structure containing a blue dye, pigment, or filter, and one or two pixel structures containing a green dye, pigment, or filter) can be horizontally arranged and operated to collectively produce a wide range of apparent colors to human vision. For subtractive color in dye/LC guest/host systems, a color pixel may contain three layers that are vertically arranged and that respectively use cyan, magenta, and yellow dyes as the primary colors. Pixel structures using other numbers or combinations of colors or arrangements of sub-pixels could also be used.

The pixel structures in an exemplary configuration of display 100 are bistable and able to switch LCs between two stable tilt alignments or states. In one tilt state, the director is mostly vertical, and in the other tilt state, the director is more planar. As described above, the LC is doped with dye, e.g., dichroic or pleochroic dye, of a type such that the vertical state appears light because the dye absorbs little or no light. The more-planar state appears dark, because the dye absorbs more light of a frequency or frequencies associated with the dye. In general, the more-planar state in a bistable pixel structure is not fully planar, so that the dye does not achieve the maximum possible absorbance. For example, in a pixel structure containing a microstructure device or grating to stabilize LC tilt states, the tilt angle of the LCs generally only changes at one surface or electrode of the pixel structure giving a maximum tilt angle difference of about 45 degrees on average between the two tilt states. As described further below, the pixel structure in display 100 contains LCs with chiral additive in a specific proportion or concentration such that in the vertical tilt state, the director is uniformly aligned and oriented so that the dye has little or no effect on the light traversing the pixel structure, but in the more-planar tilt state, the director field collapses into a twisted configuration in which the helical nature of the chiral additive controls the orientation and pattern of the LCs and dye. In some pixel structures, the pattern of the LCs in the twisted configuration provides a fingerprint texture for the absorption by the dye. The twisted configuration provides greater optical effect or absorption from the dye than would the LCs/dye if in an untwisted configuration while in the more-planar tilt state.

Figure 2A:
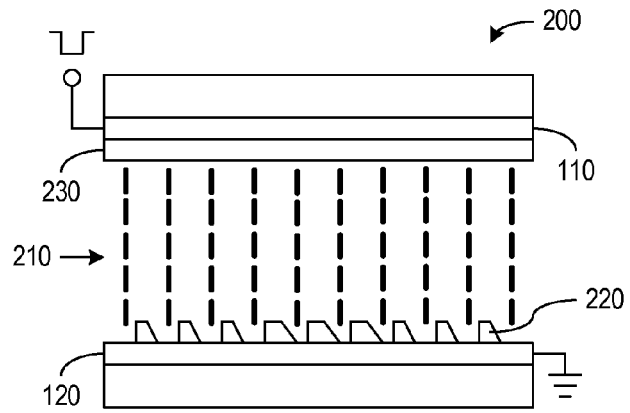
FIGS. 2A and 2B show cross-sectional views of a zenithal bistable device (ZBD) pixel structure and schematically illustrate two stable tilt states of liquid crystal molecules in the pixel structure.
Figure 2B:
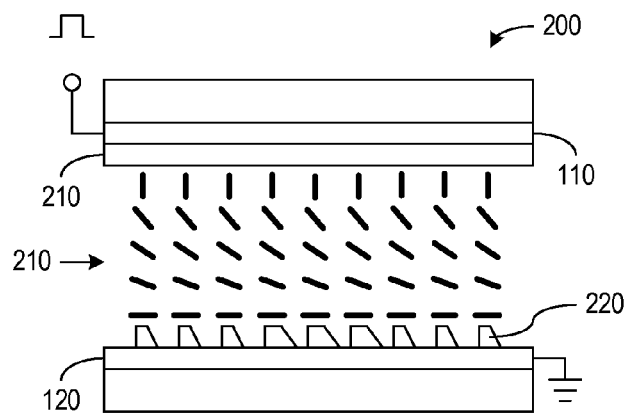

FIGS. 2A and 2B illustrate a pixel structure 200 that includes portions of electrodes 110 and 120, a liquid crystal 210 in a cell gap between electrodes 110 and 120, a microstructure or grating 220, and an anchoring layer 230. A cell gap between grating 220 and anchoring layer 230 contains a layer of liquid crystal 210 that may be about 3 to 10 μm thick or more likely about 5 to 7 μm thick. Pixel structure 200 in an exemplary configuration is a zenithal bistable device (ZBD) that can be used for each pixel of display 100 of FIG. 1 to form a ZBD display. For a ZBD, grating 220 is patterned to stabilize tilt states of liquid crystal 210. In particular, grating 220 can be treated to give homeotropic alignment at the surface of grating 220 or can be made from a material that inherently gives homeotropic alignment of LC 210 at the surface of grating 220. The patterns or contours of the surface of grating 220 thus distorts the alignment of LC 210. LC 210 is an elastic medium, and with a suitable design of grating 220, there are two states, e.g., tilt states of LC 210, that can satisfy the boundary conditions imposed by grating 220 and anchoring layer 230. Each state may be stable, so that the state persists without an applied voltage. Anchoring layer 230 in the configuration of FIGS. 2A and 2B provides homeotropic anchoring of LC 210, i.e., layer 230 is such that the director of LC 210 is normal to the surface of layer 230 and therefore vertical at the surface of layer 230. Standard homeotropic treatments that can be applied to grating 220 and anchoring layer 230 include chrome complexes, lecithin, homeotropic polyimides, silane based materials (e.g., DMOAP), surfactants, and silicon oxide depositions to provide homeotropic anchoring of a liquid crystal such as E7, 5CB, and zli2293 or a negative dielectric anisotropy LC material such as zli-4788-000 and MBBA.

Grating 220 can be shaped or patterned as described above so that two stable director field configurations can exist for LC 210 between each portion of grating 220 and a corresponding portion of anchoring layer 230. FIG. 2A shows LC 210 in a vertical tilt state, and FIG. 2B shows LC 210 in a more planar tilt state. In the vertical tilt state, the director field of LC 210 is substantially vertical at the surfaces of both grating 220 and anchoring layer 230 and throughout the cell gap. In the more-planar tilt state, the director field at grating 220 may be substantially horizontal, but the director field near anchoring surface 230 remains vertical. Pixel 200 can be switched between the tilt states of FIGS. 2A and 2B through application (e.g., by row and column driver circuits 112 and 122) of a voltage pulse of sufficient magnitude and duration through electrodes 110 and 120. The particular voltage and duration of a pulse sufficient to switch between tilt states generally depends on the specific construction of pixel structure 200 and particularly the pattern of grating 220. In FIGS. 2A and 2B, the respective tilt states are uniform across the area of pixel structure 200. More generally, grating 220 may include variations that provide different thresholds for switching of the tilt state in different regions of pixel structure 200, so that pixel structure 200 may simultaneously include areas in different tilt states. Accordingly, the percentage of the area of pixel structure 200 in the tilt state of FIG. 2A or 2B may be varied to provide a range of average absorption in pixel structure 200.

Modern liquid crystal materials that could be used for LC 210 are typically made from blends of many different components that together provide the desired properties, and in particular, one or more of the components of LC 210 could be chiral to provide the desired propensity to collapse into the twisted state. However, there may be materials that inherently have the desired chiral properties for some pixel structures. LC 210, in one specific example, is a nematic LC that is doped with a chiral additive, so that LC 210 tends to form a helical structure. Nematic LCs and chiral additives are currently available from a variety of commercial sources. One example of a suitable nematic LC is zli2293 from Merck KGaA, and an example of a chiral additive is zli811 also from Merck KGaA. Adding a chiral additive to nematic LC gives LC 210 a helical pitch that depends on the concentration of the chiral additive. The helical pitch of LC 210, in general, is inversely proportional to a product of the concentration of the chiral additive and the helical twisting power of the chiral additive. In pixel structure 200, the concentration of chiral additive may be selected so that the helical pitch of LC 210 is comparable with the thickness of the LC layer (i.e., to the cell gap) in pixel structure 200. For example, the ratio of the cell gap to the helical pitch of LC 210 may be in a range from about 0.8 to 1.3 or in a range from about 0.9 to 1.1. As a result, LC 210 in the more-planar tilt state of FIG. 2B collapses to a twisted configuration that may provide a fingerprint texture to the effect of the dye associated with the LC. This twisted configuration exhibits a complex 3D structure in which the helix lies substantially in the plane of pixel structure 200.

The concentration of the chiral dopant in LC 210 determines the helical pitch of LC 210 and should be within a critical range of concentrations that perform as desired. If the concentration of chiral dopant is too low, the more-planar state of FIG. 2B may not form the complex 3D structure and therefore may not provide as high of a contrast with the vertical state of FIG. 2A. As the concentration of chiral dopant increases, the planar state first starts to exhibit fingers and a fingerprint pattern. For higher concentrations or if the LC is more planar at grating 220, the fingers become closer packed and eventually disappear. However, in the more-planar state, LC 210 remains planar further into the cell (that is the region where the director field is nearly planar extends farther from grating 220) as a result of the twisted configuration of LC 210. If the concentration of chiral dopant is too high, the vertical state of FIG. 2A becomes unstable, and LC 210 collapses into a twisted configuration in the vertical state as well as in the horizontal state. A desirable range of concentration of chiral additive may be centered on a concentration such that the helical pitch of LC is close to the gap in pixel structure 200. The range of concentration of the chiral additive in pixel structure 200 generally depends on the particular liquid crystal used in LC 210 and on the chiral additive used. In one example, liquid crystal layer 210 is zli2293 with a concentration of chiral additive zli811 such that the chiral pitch of the LC is close to the gap in the pixel structure 200. For a liquid crystal layer about 5 µm thick a concentration of 1.5% to 1.8% by weight of zli811 may be used, which corresponds to a pitch/cell gap ratio of 1.02-1.22.

Figure 3:
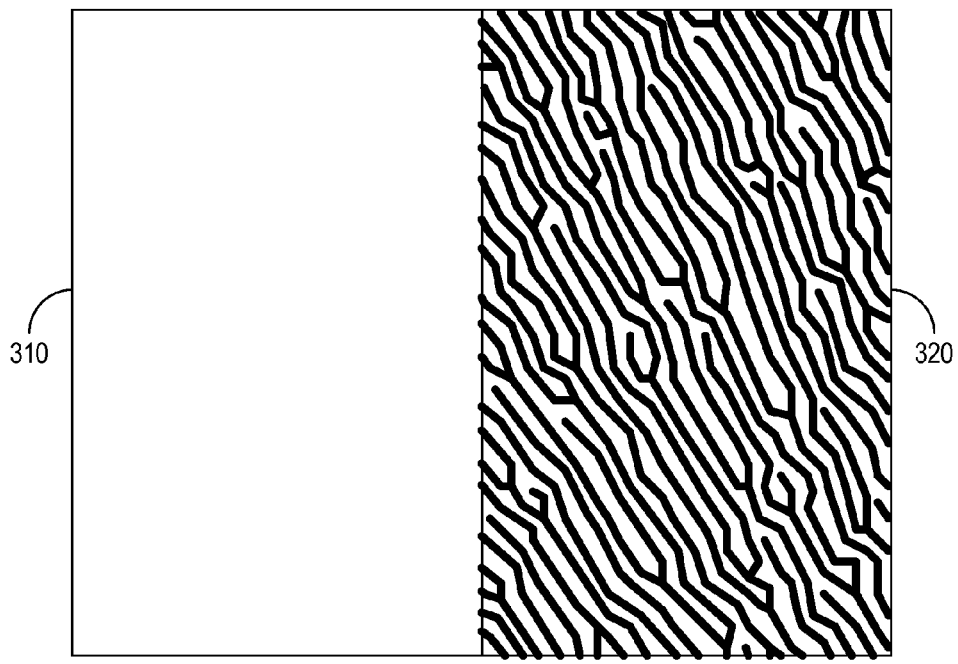
FIG. 3 illustrates the difference between visual appearances of a uniform vertical state of a pixel structure and a textured more-planar state of the pixel structure.

FIG. 3 illustrates typical optical properties of pixel structure 200 in the tilt states of FIGS. 2A and 2B. In particular, in the state of FIG. 2A, pixel structure 200 has the clear or bright appearance of area 310. In the state of FIG. 2B, pixel structure 200 has the appearance of a fingerprint texture as in area 320, where dark areas correspond to strong absorption by the dye in LC 210 and appear as bands or lines that separate lighter areas. The twisted configuration of LC 210 and the associated dye, which together causes the fingerprint pattern for absorption of light, has been found to significantly enhance the absorbance of the more-planar tilt state of pixel structure 200. As noted above, higher concentrations of chiral additive or a more planar tilt state tend to provide a denser or finer finger print pattern or a smooth distribution that still provides an improved contrast with the vertical tilt state, provided that the concentration is not so high that the vertical tilt state also spontaneously transitions to a twisted configuration. In practice, for a particular grating or pixel structure surface that controls the more-planar tilt state of the LC, the highest practical chiral dopant concentration that still retains the vertical state may provide the best contrast. Further improvements in contrast can come from making the twisted configuration increasingly planar at grating surface 220 and consequently in the bulk of LC 210. The increase in planarity also makes the fingerprint pattern finer until the fingerprint pattern eventually disappears.

Figure 4A:
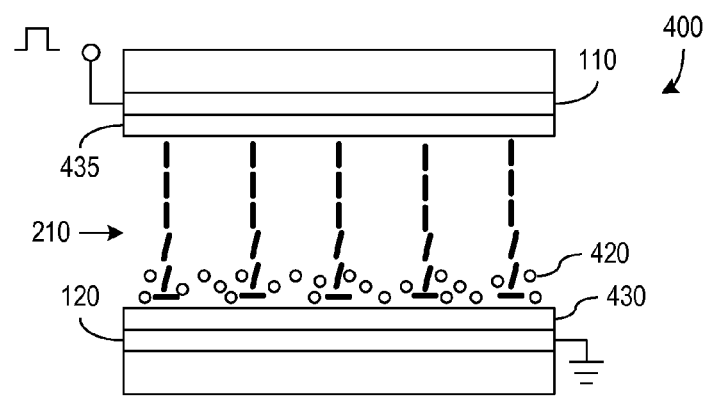
FIGS. 4A and 4B show cross-sectional views of an electrophoretic particle controlled nematic (EPCN) pixel structure and schematically illustrate two stable tilt states of liquid crystal molecules in the pixel structure.
Figure 4B:
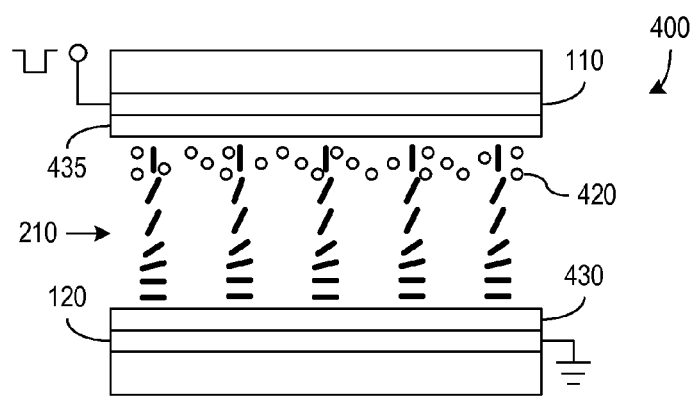

Use of a twisted configuration of a more-planar tilt state to improve contrast between the vertical and more-planar states is applicable to a range of display devices and particularly to display devices having an asymmetry in the alignment surface, i.e., having different alignment conditions on the two surfaces. FIGS. 4A and 4B, for example, show cross-sectional views of a pixel structure 400 containing a liquid crystal 210 and electrophoretic particles 420 to stabilize two tilt states of LC 210. Pixel structures 400 can be used in the passive matrix architecture of FIG. 1 to form a display. (Displays using pixel structures of the type illustrated in FIGS. 4A and 4B are sometimes referred to as electrophoretic particle controlled nematic displays or EPCN displays). LC 210 is between two anchoring layers 430 and 435. Anchoring layer 430 provides homeotropic anchoring of LC 210 and can be formed of a suitable material or with a treated surface as described above. Anchoring layer 435 provides homogeneous anchoring of LC 210, i.e., layer 435 is such that the director of LC 210 is parallel to the surface of layer 435 at the surface of layer 435. Anchoring layer 435 can be made of a material such as a polyimide, Teflon or other fluoropolymers, PVA, or evaporated silicon oxide that provides homogeneous anchoring of an LC such as E7, 5CB, zli2293, zli-4788-000, or MBBA to name a few. Electrical signals applied to electrodes 110 and 120 can move electrophoretic particles 420 toward either layer 430 or 435. In particular, FIG. 4A shows a tilt state where particles 420 are adjacent to layer 430 and disrupt the director field adjacent to layer 430. As a result, LC 210 in the state of FIG. 4A mostly has a vertical orientation. In contrast, FIG. 4B shows a state where particles 420 are adjacent to layer 435, and LC 210 in the state of FIG. 4B is more planar. The tilt states of pixel structure 400 when a nematic liquid crystal is used have similar properties to the tilt states of microstructure stabilized displays, in that the difference in tilt angle is not sufficient to achieve a high dynamic range reflective display. Accordingly, the concentration of chiral additive in LC 210 is chosen so that the more-planar tilt state of FIG. 4B forms a twisted configuration of LC 210, while the vertical state of FIG. 4A is in an untwisted configuration of LC 210.

Figure 5:
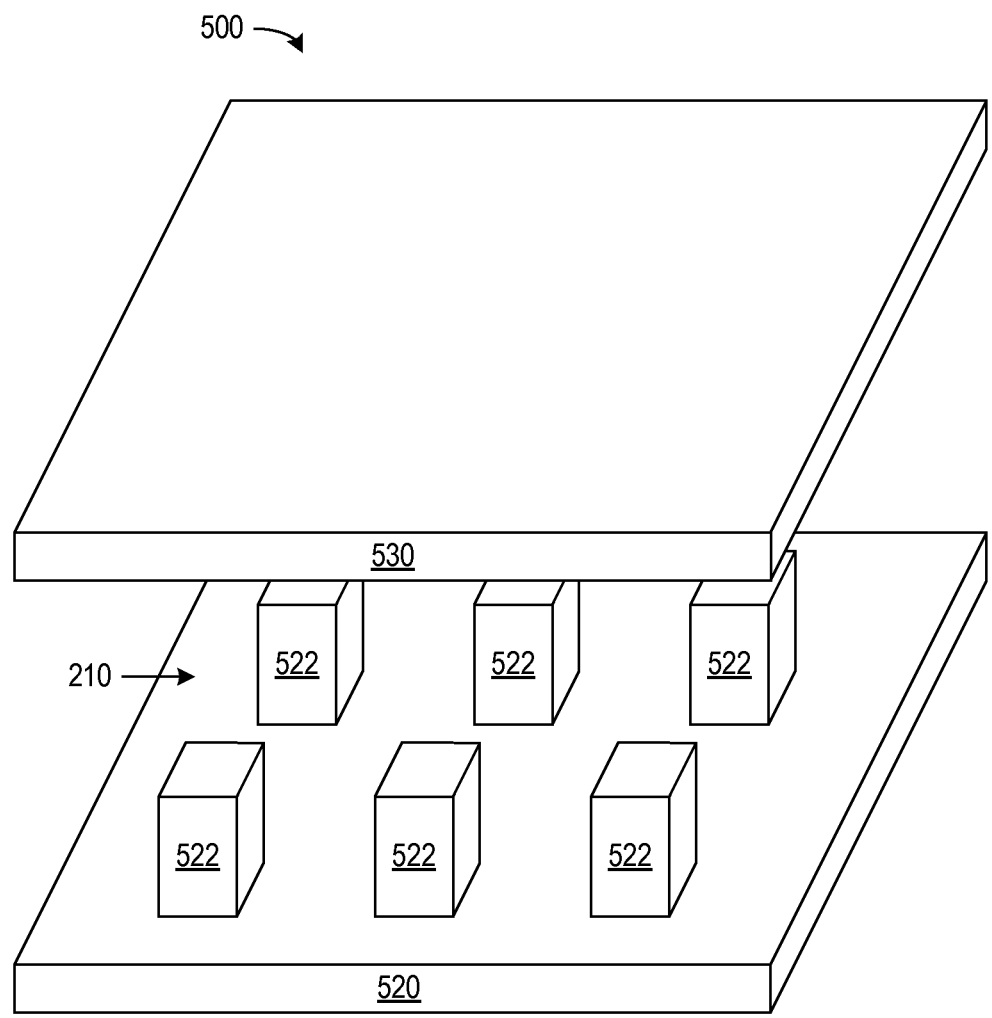
FIG. 5 shows a perspective view of a post aligned bistable nematic (PABN) pixel structure.

Pixel structures 200 and 400 as described above are examples of particular bistable devices. FIG. 5 shows another example, which is a pixel structure 500 for a post-aligned bistable nematic (PABN) display. Pixel structure 500 includes an LC material 210 sandwiched between the surfaces of two anchoring layers 520 and 530. Anchoring layer 530 has a planar surface with homeotropic anchoring, but anchoring layer 520 includes an array of microscopic posts 522 with homogeneous anchoring. The homogeneous anchoring of posts 522 provides two stable tilt states. In one tilt state, LC 210 is vertically oriented up the sides of posts 522. In the other tilt state, LC 210 is oriented more horizontally around the perimeter of each post. Accordingly, switching pixel structure 500 from the vertical tilt state to the more-planar tilt state mostly switches the director field of LC 210 at one side, i.e., nearest layer 520. Planar electrodes, e.g., electrodes 110 and 120, can be placed above and below the illustrated structure of FIG. 5 for switching between the two tilt states of pixel structure 500. As described above, in addition to dye, LC 210 contains a chiral additive in a concentration such that LC 210 has an untwisted configuration in the vertical tilt state and a twisted configuration in the more-planar tilt state.

Several other technologies are in use or proposed today for reflective displays, and in general the principles described herein may be used to improve contrast by improving the effectiveness of dyes such as dichroic or pleochroic dyes that having directional characteristics when the dyes are associated with LCs in a nominally parallel tilt state. In particular, bistable displays using tilt states of an LC generally have limited dynamic range because the difference in the tilt angle between the two tilt states is typically not close to the theoretical maximum of 90°. Use of a LC with a chiral additive causing the LC configuration to collapse into a twisted configuration for only the darker tilt state can generally improve the dynamic range for most types of bistable displays.

Although particular implementations have been disclosed, these implementations are only examples and should not be taken as limitations. Various adaptations and combinations of features of the implementations disclosed are within the scope of the following claims.

What is claimed is:

1. A reflective display device comprising:
a liquid crystal containing a dye; and
a pixel structure containing the liquid crystal within a cell gap, wherein:
the pixel structure permits the liquid crystal material to switch between a first tilt state and a second tilt state;
the liquid crystal material is receptive to application of a voltage to transition between the first tilt state and the second tilt state, the liquid crystal material stably persisting in a current tilt state absent voltage application after the application of the voltage to transition to the current tilt state;
in the first tilt state, the liquid crystal is in an untwisted configuration;
in the second tilt state, the liquid crystal is in a twisted configuration in which the liquid crystal orients the dye to create a fingerprint pattern for absorption of light, and the dye has an effective absorption that is higher than an effective absorption of the dye when the liquid crystal is in the first tilt state.

2. The device of claim 1, wherein the liquid crystal has a helical pitch that is between 0.8 and 1.3 times a thickness of the cell gap.

3. The device of claim 1, wherein the liquid crystal has a helical pitch that is between 0.9 and 1.1 times a thickness of the cell gap.

4. The device of claim 1, wherein the pixel structure is selected from a group consisting of a zenithal bistable device, an electrophoretic particle controlled nematic device, and a post-aligned bistable nematic device.

5. A reflective display device comprising:
a liquid crystal containing a dye; and
a pixel structure containing the liquid crystal within a cell gap such that a ratio of the cell width to a helical pitch of the liquid crystal is greater than 0.8, wherein:
the pixel structure permits the liquid crystal to switch between a first tilt state and a second tilt state;
the liquid crystal receptive to application of a first voltage to transition from the first tilt state to the second tilt state, the liquid crystal stably persisting in the second tilt state after transition thereto absent voltage application;
the liquid crystal receptive to application of a second voltage to transition from the second tilt state to the first tilt state, the liquid crystal persisting in the first tilt state after transition thereto absent voltage application;
in the first tilt state, the liquid crystal is in an untwisted configuration; and
in the second tilt state, the liquid crystal is in a twisted configuration, and the dye has an effective absorption that is higher than an effective absorption of the dye when the liquid crystal is in the first tilt state.

6. The device of claim 5, wherein the pixel structure is selected from a group consisting of a zenithal bistable device, an electrophoretic particle controlled nematic device, and a post-aligned bistable nematic device.

7. The device of claim 5, wherein the liquid crystal comprises a nematic liquid crystal and further contains a chiral additive.

8. The device of claim 5, wherein the ratio of the helical pitch to the cell width is in a range that is between 0.9 and 1.1.

9. The device of claim 5, wherein the pixel structure comprises:
a first layer having a surface that provides homeotropic anchoring of the liquid crystal; and
a second layer having a surface that is patterned so that the first and second tilt states are stable absent application of the voltage.

10. The device of claim 9, wherein the surface of the second layer contains a microstructure.

11. The device of claim 5, wherein the pixel structure comprises:
a first layer having a surface that provides homeotropic anchoring of the liquid crystal;
a second layer having a surface that provides homogeneous anchoring of the liquid crystal; and
electrophoretic particles in the liquid crystal.

12. The device of claim 5, wherein the pixel structure comprises a first surface and a second surface that are asymmetric in that the first surfaces gives the liquid crystal an alignment that differs from an alignment that the second surface gives to the liquid crystal.

13. A process comprising:
providing in a gap of a pixel structure a liquid crystal containing a dye; and
applying voltage to switch the liquid crystal in the pixel structure between a first stable tilt state and a second stable tilt state, the liquid crystal stably persisting in a current tilt state absent voltage application after the application of the voltage to transition to the current tilt state, wherein:
in the first stable tilt state, the liquid crystal is in an untwisted configuration; and
in the second stable tilt state, the liquid crystal is in a twisted configuration, and the dye has an effective absorption that is higher than an effective absorption of the dye when the liquid crystal is in the first stable state, wherein the first and second stable tilt states are stable absent application of a voltage.

14. The process of claim 13, wherein the liquid crystal has a helical pitch such that a ratio of a cell width of the pixel structure to a helical pitch of the liquid crystal is greater than 0.8.

15. The process of claim 13, wherein in the second tilt state, the dye in the liquid crystal creates a fingerprint pattern for absorption of light.

\* \* \* \* \*